(12) United States Patent
Ashikian

(10) Patent No.: US 8,297,056 B2
(45) Date of Patent: Oct. 30, 2012

(54) SYSTEM AND METHOD FOR STORING, DISSEMINATING, AND UTILIZING ENERGY IN THE FORM OF GAS COMPRESSION AND EXPANSION INCLUDING THERMO-DYNAMIC BATTERY

(76) Inventor: Daniel Ashikian, Van Nuys, CA (US)

( * ) Notice: Subject to any disclaimer, the term of this patent is extended or adjusted under 35 U.S.C. 154(b) by 0 days.

(21) Appl. No.: 13/385,645

(22) Filed: Feb. 27, 2012

(65) Prior Publication Data

US 2012/0227392 A1   Sep. 13, 2012

Related U.S. Application Data

(63) Continuation of application No. 12/804,657, filed on Jul. 27, 2010, now abandoned, which is a continuation of application No. 11/805,093, filed on Jul. 5, 2007, now abandoned, which is a continuation of application No. 11/126,920, filed on May 10, 2005, now abandoned, which is a continuation of application No. 10/833,958, filed on Apr. 28, 2004, now abandoned, which is a continuation of application No. 09/854,682, filed on May 15, 2001, now abandoned.

(51) Int. Cl.
*F01K 25/02* (2006.01)

(52) U.S. Cl. .............................. 60/650; 60/659; 60/662

(58) Field of Classification Search ..................... 60/645, 60/650, 659, 660, 662, 663
See application file for complete search history.

(56) References Cited

U.S. PATENT DOCUMENTS

| | | | | |
|---|---|---|---|---|
| 3,023,575 | A * | 3/1962 | McCombs, Jr. | 60/790 |
| 3,786,631 | A * | 1/1974 | Manning et al. | 60/641.1 |
| 4,150,547 | A * | 4/1979 | Hobson | 60/659 |
| 4,185,465 | A * | 1/1980 | Shaw | 60/678 |
| 4,281,256 | A * | 7/1981 | Ahrens et al. | 290/1 R |
| 4,910,414 | A * | 3/1990 | Krebs | 290/2 |
| 6,827,104 | B2 * | 12/2004 | McFarland | 137/624.13 |
| 6,923,016 | B2 * | 8/2005 | Funakoshi et al. | 62/324.1 |

\* cited by examiner

*Primary Examiner* — Hoang Nguyen

(57) ABSTRACT

Thermo-dynamic battery is an energy storage unit for converting compressed gas energy into consumable electrical power for application uses with any device that requires electrical power to function. A method for storing electrical energy in the form of compressed gas and converting the same energy to electric power includes compressing gas and storing the compressed gas for release to drive a generator. A system and method for storing, disseminating, and utilizing energy in the form of gas compression and expansion comprises a method for expanding compressed gas in at least two stages and further provides for storing energy in the form of compressed gas through compression in at least two stages. Apparatus is provided to operate in accordance with the described procedure to contribute at or about 90% efficiency.

17 Claims, 2 Drawing Sheets

THERMO-DYNAMIC BATTERY

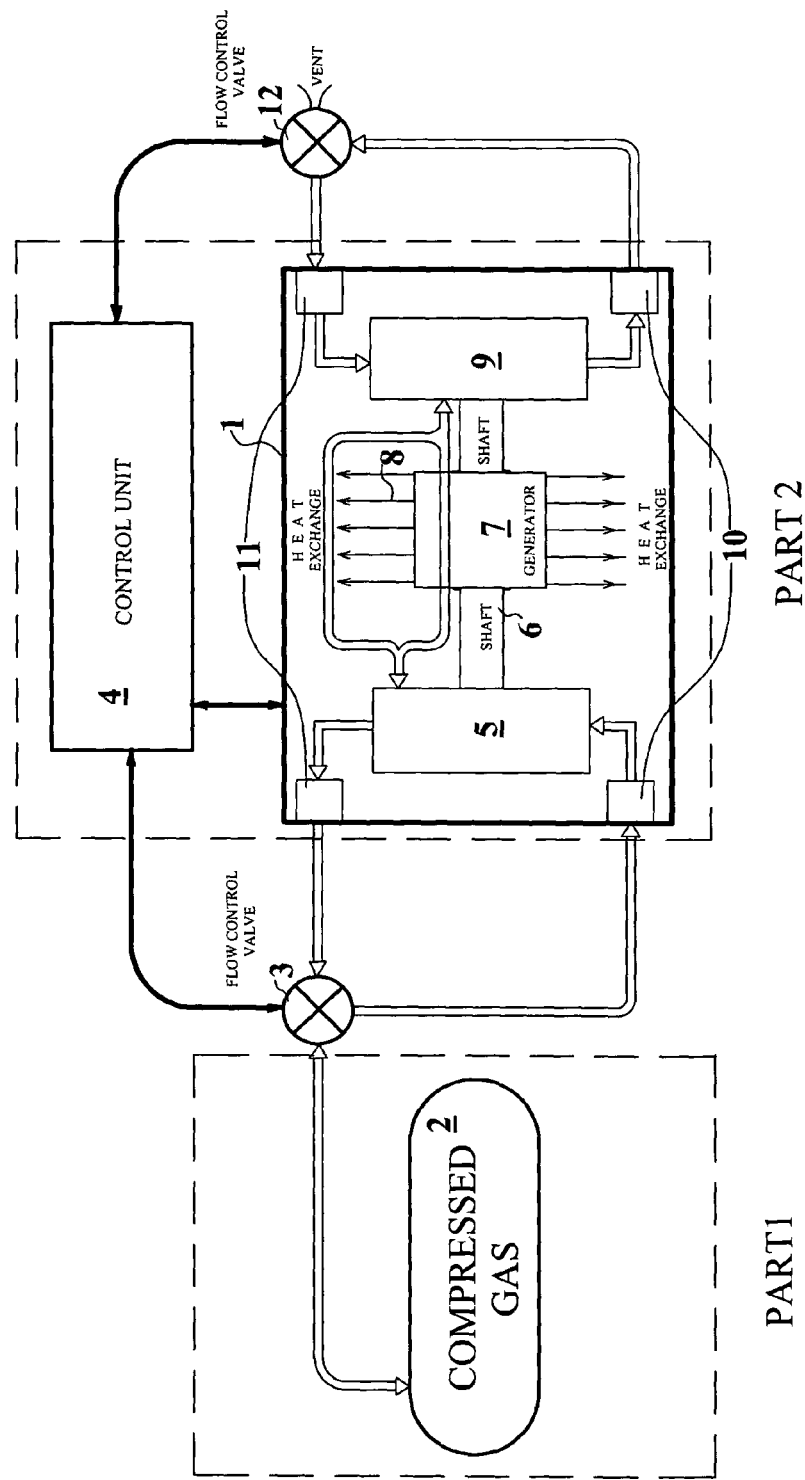
FIG. 1, SCHEMATIC VIEW OF THERMO-DYNAMIC BATTERY UNIT

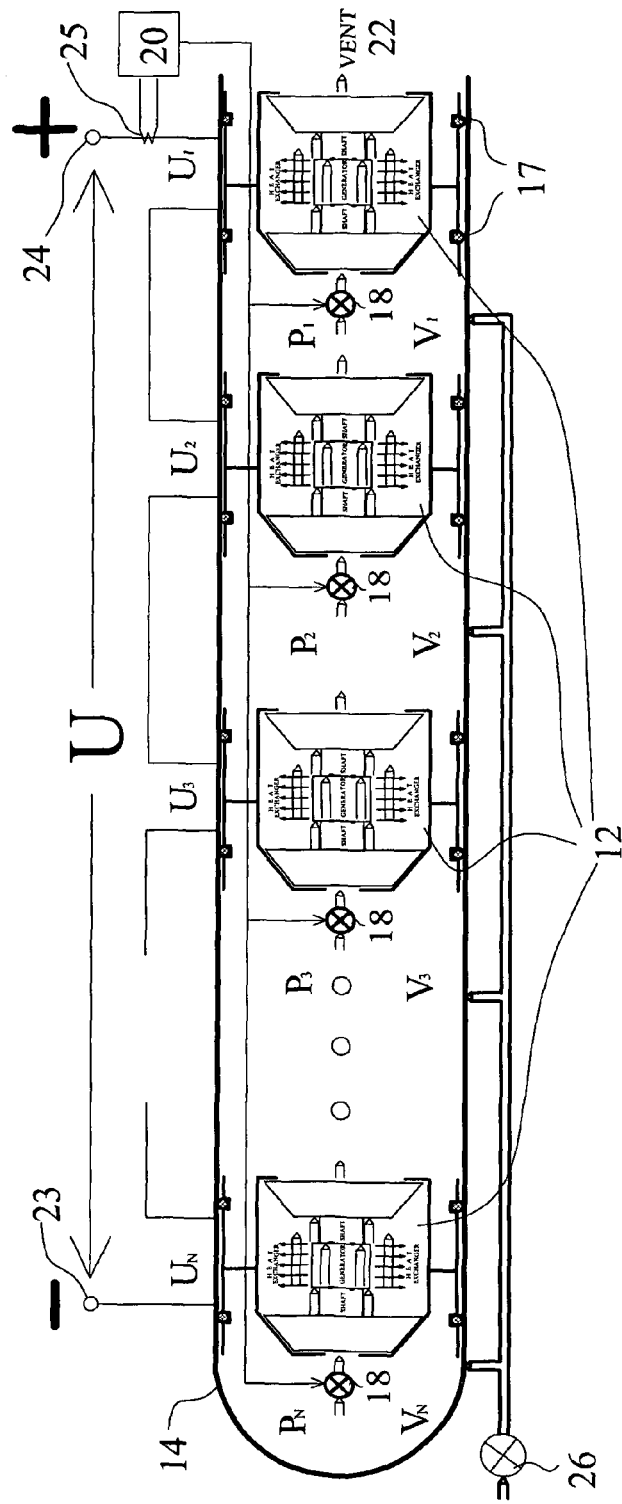
FIG. 2 THERMO-DYNAMIC BATTERY

SYSTEM AND METHOD FOR STORING, DISSEMINATING, AND UTILIZING ENERGY IN THE FORM OF GAS COMPRESSION AND EXPANSION INCLUDING THERMO-DYNAMIC BATTERY This application is a continuation of U.S. application Ser. No. 12/804,657, filed on Jul. 27, 2010, abandoned, which is a continuation of U.S. application Ser. No. 11/805,093, filed on Jul. 5, 2007, abandoned, which is a continuation of U.S. application Ser. No. 11/126,920, filed on May 10, 2005, abandoned, which is a continuation of U.S. application Ser. No. 10/833,958, filed on Apr. 28, 2004, abandoned, which is a continuation of U.S. application Ser. No. 09/854,682, filed on May 15, 2001, abandoned.

BACKGROUND OF THE INVENTION

Generally, we mankind, have had major problems with relation to batteries that is, devices for storing energy for use when desired. The problems include: the charging of batteries, servicing of batteries, the non-reusability of batteries, and the highly dangerous, hazardous, and explosive, environmentally-polluting chemicals used in existing electrochemical batteries, and their heavy weight.

The thermo-dynamic battery unit of the invention solves all of these issues. It generates clean, usable energy, while remaining chemical and explosion free, lightweight, rapidly rechargeable, economical, and environmentally-friendly.

The present invention relates generally to a device for use in any application for providing power for any electrical device that employs battery power to function. More explicitly, the present invention discloses an innovative, high power device, which does not generate any harmful, environmentally-polluting residue. The present invention is extremely ecologically compatible in operation and design, actually replenishing clean ozone back into the atmosphere, is long lasting, and is designed to be re-usable unlike conventional units.

OBJECTS OF THE INVENTION

The present invention relates generally to a new electric power storage device. More distinctively, it provides and generation of electrical power in the form of compressed gas energy.

Another positive attribute of the present-invention is that the compressed gas is passed through a generator, which exchanges heat with the generator to increase the efficiency of the generator and its driver device. This enhances efficiency of use of energy that is stored and conserved in the thermo-dynamic battery unit in accordance with the invention.

Another positive attribute of the present invention is that the thermo-dynamic battery unit is modular unit comprised of, and connectable together a compressed air storage for storing energy in the form of compressed air, and Electricity Pressure Mutual Converter for converting the electricity to pressure and pressure to electricity by provided and coupled Expander-Compressor with Motor-Generator in single embodiment of apparatus.

Another positive attribute of the present invention is that by dividing and partitioning the compressed air storage tank into separate smaller modular self-contained energy storing and producing units we can store and recover energy much more efficiently than existing compressed air energy storage systems.

Another positive attribute of the present invention is that the working pressure of compressor-expander as much as possible is smaller to gain higher efficiency, which is effortless to manufacture.

SUMMARY OF THE INVENTION

A plurality of thermodynamic battery units is connectable to store and generate electrical energy by converting electrical power in the form of compressed gas, and reversing the process by converting compressed gas into the electricity.

A system for storing and generating power from gas includes at least two (2) thermo-dynamic battery units connectable in series to one another for controllable compression and expansion of the gas to drive a compressor and generator. A method in accordance with the invention comprises providing at least two (2) thermo-dynamic battery units connectable in series with one another for controllable compression and expansion of the gas to drive a compressor and generator.

The present invention provides a unique battery system, which stores and produces, from compressed gas energy, clean usable electrical power for use in any application in any device that can employ battery power to operate. The invention is much efficient for the same energy output than existing units, can be charged in rather than hours, and operates chemical and explosion free. Environmentally safe to operate, and operates at or about 90% efficiency.

A system and method in accordance with the invention for storing, disseminating, and utilizing energy in the form of gas compression and expansion comprises a method for storing energy including the steps of providing power to compress gas in at least two stages with at least two pressure changes, to a receptacle where the gas is compressed and held for dissemination to provide power. The method provides for dissemination of stored energy when proceeding in reverse, i.e., when said compressed gas is expanded with at least two pressure changes and the output is coupled to at least one generator. A system in accordance with the invention operates in accordance with said method and employs apparatus to implement said method with at least two expanders-compressors coupleable to at least one motor-generator. When operated in the opposite manner, which is if electrical power supplied to motor-generator said system compressing gas and provides energy storage in the form of compressed gas.

BRIEF DESCRIPTION OF DRAWINGS

FIG. 1 is a schematic view of a thermo-dynamic battery unit in accordance with the invention.

FIG. 2 is a schematic view of an arrangement in accordance with the invention of a plurality of thermo-dynamic battery units.

DETAILED DESCRIPTION OF THE INVENTION

As shown in FIG. 1, a thermo-dynamic battery unit in accordance with the invention comprises a Electricity Pressure Mutual Converter 1 for converting electricity to compressed gas and converting compressed gas to electricity, a tank 2 for storing compressed gas, a Motor-Generator 7 connected with at least two Expander-Compressor sets 5, 9 in series with common shaft 6, a heat exchanger chamber space 8 between Motor-Generator armature and rotor, four check valves 10 and a control unit 4, including a flow control valve 3 and 11 for controlling release flow and direction of compressed gas from and to tank 2. Tank 2, control unit 4, and generator 7 are of conventional type.

Electricity Pressure Mutual Converter 1 able to work in two mode; compression and expansion. In the compression mode, while the electricity applied to Motor-Generator 7, the Motor-Generator 7 rotates the Expander-Compressor van set 5, 9 toward one of two possible directions, and forces the gas to compress. In the enclosed heat exchanger chamber 8 a space where the gas exchanges heat with Motor-Generator, which according under the lows of thermodynamic contributes to increase the gas pressure. The check valves 10 arranged such so the pressurized gas will be forced to flow to the direction of the tank 2 for storage. Pressure sensors 12 and load demand sensor 25, sensing to control unit 4 the pressure of the gas and the power demand. The control unit 4 decides and acts in which mode, how much flow, and how much pressure must be in each stage to achieve optimal pressure deferential on each stage for simultaneous compression and expansion of the gas. The control unit 4 controls the direction and flow rate of gas by flow control valves 3 and 11 in the form of varying voltage signals. The flow control valve 3 is combination of conventional two way solenoid valve and electro mechanical proportional valve.

The tank volumes and maximum pressures are pre calculated and partitioned appropriately for various applications to meet the power demand for particular application.

In the expansion mode the gas released from tank 2 under control of unit 4 passing through first Expander-Compressor van set 5 will cause expand the gas from smaller space to larger space, which will force the common drive shaft 6 to turn towards the other direction of said two possible directions. As long as Motor-Generator rotor attached to the same common drive shaft 6 will cause Motor-Generator 7 to operate, which in turn generates electricity and some incidental heat. Generated heat expands the released gas causing the second set of fan blades Expander-Compressor van 9 to operate, which is transmitted back to Motor-Generator 7 with a common drive shaft 6 to operate Motor-Generator 7. Check valves 10 arranged such so the expanding gas flows towards the vent.

The released gas is in thermal contact with heat exchanger chamber 8, space between the Motor-Generator 7 armature and rotor, long enough to achieve expected results. At the same time, the released gas—which under the laws of thermodynamics cools as it expands upon release—cools Motor-Generator 7 and increases generator efficiency thereby. Generating of electricity is thus controlled by control unit 4 and flow control valve 3 and 11.

As shown in FIG. 2, a thermo-dynamic battery system comprises a plurality of individual Electricity Pressure Mutual Converter 12, in the case depicted herein numbering four. This number is provided for specificity; the invention in this embodiment may operate with as few as two individual units as well as with an unlimited number thereof.

Each individual unit 12 operates in the same manner as thermo-dynamic battery unit 1 described above. In the present embodiment, the respective units 12 are depicted as connected to one another within a tank 14. Each unit 12 is held in place by conventional means and is sealed by O-rings 17. The space between each Electricity Pressure Mutual Converter intended to store compressed gas.

Each unit 12 includes a flow control valve 18 (FIG. 2) controlled by a controller regulator 20. In each unit 12 the gas is compressed and released controllably and simultaneously at a predetermined different pressure levels to create equal pressure differentials between tanks. As depicted, the unit 12 at the left end of tank 14 is at the highest pressure, shown here as P.sub.N and unit 12 at the right hand end of tank 14 is at the lowest pressure, shown herein as P.sub.1. The P.sub.1 unit 12 is connectable to a vent 22 to ambient. Pressure may be 5000 psi or higher in particular applications. Pressure differential between the input and output of units 12 is as low as possible and equal each and every one, to increase the overall system efficiency.

To insure the stable and simultaneous performance of the unit the following condition must be meeting:

$$V_N > V_{N-1} > \ldots V_3 > V_2 > V_1$$

Where V is the volume of the storage tank N is the number of stages.

As depicted in FIG. 2, volume of the P.sub.N unit 12 is given as V.sub.N. Similar considerations apply to intermediate units 12, whose pressure and volume, respectively, are P.sub.3 V.sub.3 and P.sub.2, V.sub.2. Pressure in units 12 diminishes from the highest pressure, to the lowest pressure P.sub.1 with intermediate units 12 having diminishing pressure from left to right as shown in FIG. 2. For example, in the specific configuration depicted, P.sub.3 is larger than P.sub.2, which in turn is larger than P.sub.1.

As further depicted in FIG. 2, each unit 12 contributes power when the system is operated as stated below. For ease of reference, said power—in this case, voltage—is symbolized by U.sub.N through U.sub.1. Said individual contributions to the power may be employed in series, for increased voltage or in parallel for increased current.

A charging valve 26 controls charging of tank 14 with compressed gas for storage of energy therein. This may be employed for a fast or booster charge.

In the embodiment depicted in FIG. 2, a negative electrical terminal 23 is disposed at the high pressure end of tank 14 and a positive terminal 24 is disposed of the low pressure end of tank 14. The phrase "high pressure end" and "low pressure end" means in this context the location in tank 14 where, respectively, the highest pressure unit 12 (the P.sub.N unit) and the lowest pressure unit 12 (the P.sub.1 unit 12) are located.

In operation, controller regulator 20 is operable to regulate each and individual Electricity Pressure Mutual Converter to compress gas for storage and expand for electricity generation subject to load sensor 25 and pressure sensors 27 connected hereto. During the compression mode the electrical power applied to terminals 23 and 24 and the Electricity Pressure Mutual Converter under the influence of differential pressure simultaneously Electricity Pressure Mutual Converter will force to compress the gas and stored for power generation. Upon release of gas under the influence of differential pressure such that from each unit 12, voltage is generated as described in connection with the system of FIG. 1. Load sensor 25 and pressure sensor 27 regulates operation of controller regulator 20 such that for a smaller load to diminish flow of gas and for higher loads to increase gas flow. Such devices are in common usage at present as, for example, in power generating facilities which seek to maximize efficiency by matching power generation to power demand.

As noted above, the individual power outputs of units 12 can be placed in parallel to provide a larger current or in series for increased voltage. In addition, each unit 12 may be arranged (not shown) outside of partitioned tank 14 connected with the pipes.

A method for storing and using energy and employing same for generating electric power includes the steps of: (1) applying electrical power to Electricity Pressure Mutual Converter for controllably compressing gas (2) storing energy in the form of compressed gas; (3) controllably releasing said gas to operate an Electricity Pressure Mutual Converter. The gas may comprise air, and the gas may pass in thermal contact with a Motor-Generator for improved efficiency.

A method for storing energy and generating power comprises the steps of applying electrical power to Electricity Pressure Mutual Converter for controllably compressing gas, storing compressed gas for controllable release to drive an Electricity Pressure Mutual Converter and releasing the compressed gas in at least two pressure drops, thereby reducing energy loss from expansion of compressed gas. This method may be implemented by means of the apparatus depicted in FIG. 2 or similar devices. The method of the invention may be employed with a plurality of pressure drops, numbering two or more.

The foregoing-described system and method for storing, disseminating, and utilizing energy in the form of compressed gas, includes a method for storing energy in the form of gas compression by substantially reversible the foregoing-described method for generating power, using the same apparatus. Under the method, power is supplied to Electricity Pressure Mutual Converter 12 and as a result they function as motors causing the expanders therein to reverse such that air will be compressed through the 11 (FIG. 1) above-described pressure changes for storage in tank 14.

Efficiency in the forward cycle as well as the reverse cycle is promoted by the multiple pressure change aspect of the invention.

In the foregoing manner, energy losses from expansion of compressed gases are minimized, and efficiency improved.

The within specification and drawings disclose particular embodiments of the invention, which is defined by the appended claims interpreted in light of the specification and drawings.

The invention claimed is:

1. A system for storing energy and generating power comprising: At least two compressed gas storage devices comprising at least a first compressed gas storage device and at least a second compressed gas storage device, each of said gas storage devices having means for storing compressed gas and for controllably receiving and releasing said gas; at least two Electricity Pressure Mutual Converter means capable of generating power resulting from receiving a flow of gas, and compressing gas into the compressed gas storage devices resulting from supply of electrical power, said first compressed gas storage device having higher operating pressure than said second compressed gas storage device, said first compressed gas storage device and said second compressed gas storage device being connectable to one another by the first Electricity Pressure Mutual Converter and the second Electricity Pressure Mutual Converter being connectable to said second compressed gas storage device such that upon compression or release of gas from or to said first compressed gas storage device and from or to said second compressed gas storage device, gas flow proceeds such that the pressure drop across said first Electricity Pressure Mutual Converter and said second Electricity Pressure Mutual Converter is substantially equal for the duration of gas compression and expansion.

2. The invention as set forth in claim 1 wherein said Electricity Pressure Mutual Converter means comprises at least one Electricity Pressure Mutual Converter member connected to said first compressed gas storage device.

3. The invention as set forth in claim 1 wherein said Electricity Pressure Mutual Converter means comprises at least one Electricity Pressure Mutual Converter member disposed at least partially within said first compressed gas storage device.

4. The invention as set forth in claim 1 wherein said Electricity Pressure Mutual Converter means comprises at least one Electricity Pressure Mutual Converter member connected to said second compressed gas storage device.

5. The invention as set forth in claim 1 wherein said Electricity Pressure Mutual Converter means comprises at least one Electricity Pressure Mutual Converter member disposed at least partially within said second compressed gas storage device.

6. The invention as set forth in claim 1 further exchanging heat means to receive gas flow from said compressed gas storage device and to receive heat from said Electricity Pressure Mutual Converter means, wherein said heat expands the volume of said gas during expansion and increases pressure of gas during compression.

7. The invention as set forth in claim 1 wherein said Electricity Pressure Mutual Converter means includes at least two Expander-Compressor members for driving said Generator-Motor means in response to impingement upon said at least two Expander-Compressor members of gas flow, a first Expander-Compressor member being arranged to receive gas flow from said compressed gas storage device and a second Expander-Compressor member being arranged to receive gas flow from said Generator-Motor means.

8. The invention as set forth in claim 1 wherein said means for controllably releasing and compressing said gas from and to said compressed gas storage device comprises at least one controller member; at least four check valves; and at least one flow control valve for controllable release and compression of said gas.

9. The invention as set forth in claim 1 further including Electricity Pressure Mutual Converter means connectable to receive gas flow from said compressed gas storage device wherein said gas flows in direct contact with armature and rotor of Motor-Generator to exchange heat, which expands the volume of said released gas and increases the pressure of said compressed gas.

10. The invention as set forth in claim 9 wherein said Electricity Pressure Mutual Converter means includes at least two Expander-Compressor members for driving said Motor-Generator means in response to impingement upon said at least two Expander-Compressor members of gas flow, a first Expander-Compressor member being arranged to receive gas flow from said compressed gas storage device and a second Expander-Compressor member being arranged to receive gas flow from said Motor-Generator means, wherein said Motor-Generator drives said at least two Expander-Compressors in response to electrical power supply to compress gas, a first Expander-Compressor member being arranged to receive gas flow from Motor-Generator and second Expander-Compressor member being arranged to receive gas flow from said compressed gas storage device.

11. The invention as set forth in claim 1 wherein said means for controllably releasing and receiving said gas from said compressed gas storage device comprises at least four check valves; at least one pressure sensor; at least one controller member and at least one flow control valve for controllable release and receive of said gas.

12. The invention as set forth in claim 7 wherein said first compressed gas storage device includes at least one common drive shaft for said Generator-Motor means and said at least two Expander-Compressor members.

13. The invention as set forth in claim 10, wherein said second compressed gas storage device includes at least one common drive shaft for said Generator-Motor means and said at least two Expander-Compressor members.

14. A system for storing energy and generating electrical power comprising: a plurality of compressed gas storage devices for storing compressed gas at different pressure levels to create substantially equal pressure differentials between compressed gas storage devices and for controllably compressing and releasing said gas; a tank member substantially containing said plurality of compressed gas storage devices; means for controlling charging with compressed gas of said plurality of compressed gas storage devices; at least one Electricity Pressure Mutual Converter capable of generating electricity resulting from receiving a flow of gas and capable of compressing gas resulting from supply of electrical power; said plurality of compressed gas storage devices being connectable to said at least one Electricity Pressure Mutual Converter such that said compressed gas storage devices supply and receive gas flow from gas released and compressed there from to said at least one Electricity Pressure Mutual Converter thereby resulting to store and generate electrical power; control means for controlling release of compressed gas and compressing gas; heat exchange means exchanging heat between Motor-Generator and gas; and load sensor means for sensing load in connection with release of compressed gas, said control means for controlling release of compressed gas being connected with said load sensor means such that for smaller loads gas flow is diminished and for higher loads gas flow is increased.

15. The invention as set forth in claim 14 wherein said Electricity Pressure Mutual Converter had one gas input and one gas output to reduce energy losses.

16. The invention as set forth in claim 14, wherein said Expander-Compressor member is a sliding vane turbine.

17. The invention as set forth in claim 14, wherein said pressure differential is substantially equal to, less than or greater than 10 psi.

* * * * *